United States Patent [19]

Binacchi

[11] Patent Number: 4,968,240
[45] Date of Patent: Nov. 6, 1990

[54] DEVICE FOR POSITIONING PRODUCTS EXTRACTED FROM A MOLD ONTO A CONVEYOR BELT, IN PARTICULAR FOR SOAP-MOLDING MACHINES OR THE LIKE

[75] Inventor: Fulvio Binacchi, Varese, Italy

[73] Assignee: Binacchi & C. S.r.l., Gazzada Schiano, Italy

[21] Appl. No.: 300,875

[22] Filed: Jan. 24, 1989

[30] Foreign Application Priority Data

Feb. 5, 1988 [IT] Italy .............. 19329 A/88

[51] Int. Cl.$^5$ .............................. B29C 33/46
[52] U.S. Cl. .............. 425/436 R; 198/458; 198/471.1; 425/437; 425/444; 425/472
[58] Field of Search ......... 425/436 R, 436 RM, 437, 425/444, 472; 198/468.3, 471.1, 474.1, 476.1, 477.1, 803.4, 803.5, 803.14, 458

[56] References Cited

U.S. PATENT DOCUMENTS

| | | | |
|---|---|---|---|
| 3,272,360 | 9/1966 | Van Der Shoot | 198/458 X |
| 3,542,224 | 11/1970 | Warren | 198/458 X |
| 3,580,381 | 5/1971 | Kilner | 198/803.14 X |
| 3,580,442 | 5/1971 | Rohdin et al. | 198/468.3 X |
| 3,805,943 | 4/1974 | Warren | 198/458 X |
| 4,050,574 | 9/1977 | Chenevard et al. | 198/803.4 X |
| 4,425,074 | 1/1984 | Becker et al. | 198/468.3 X |
| 4,449,914 | 5/1984 | Schmidts et al. | 425/444 X |

Primary Examiner—Richard L. Chiesa
Attorney, Agent, or Firm—Guido Modiano; Albert Josif

[57] ABSTRACT

The device for positioning products extracted from a mold onto a conveyor belt comprises a main body which supports suckers which are engageable with products extracted from a mold and a first actuation device acts on the suckers to move them from a first product receiving position to a second position in which they are arranged facing a conveyor belt having product containment pockets which are spaced with a different pitch with respect to the distance of the products inside the mold. The suckers are individually movable relatively to the main body and second actuation means act thereon to vary their mutual distance in relation to the distance of the products in the mold and to the pitch of the containment pockets of the conveyor belt.

25 Claims, 3 Drawing Sheets

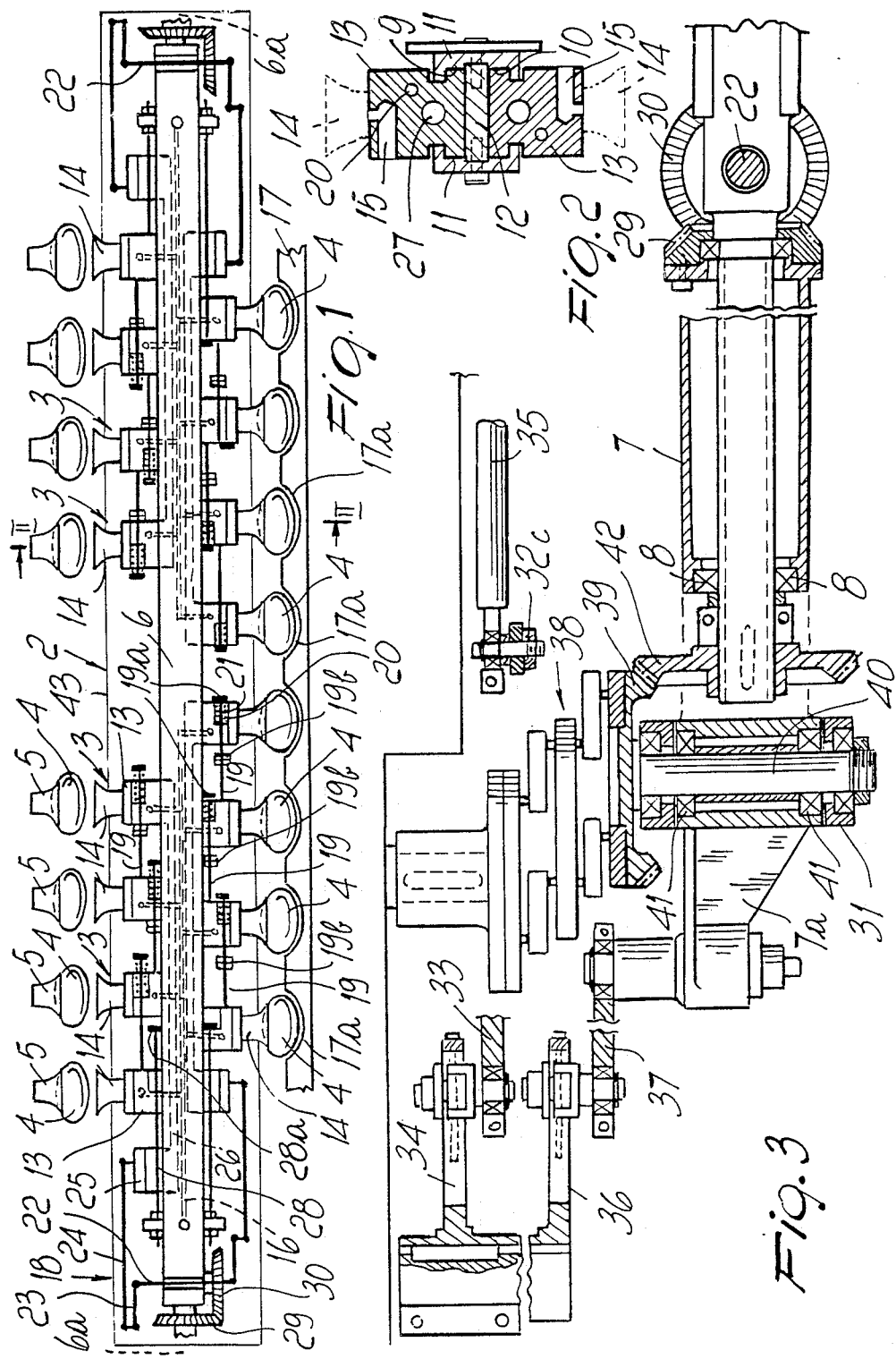

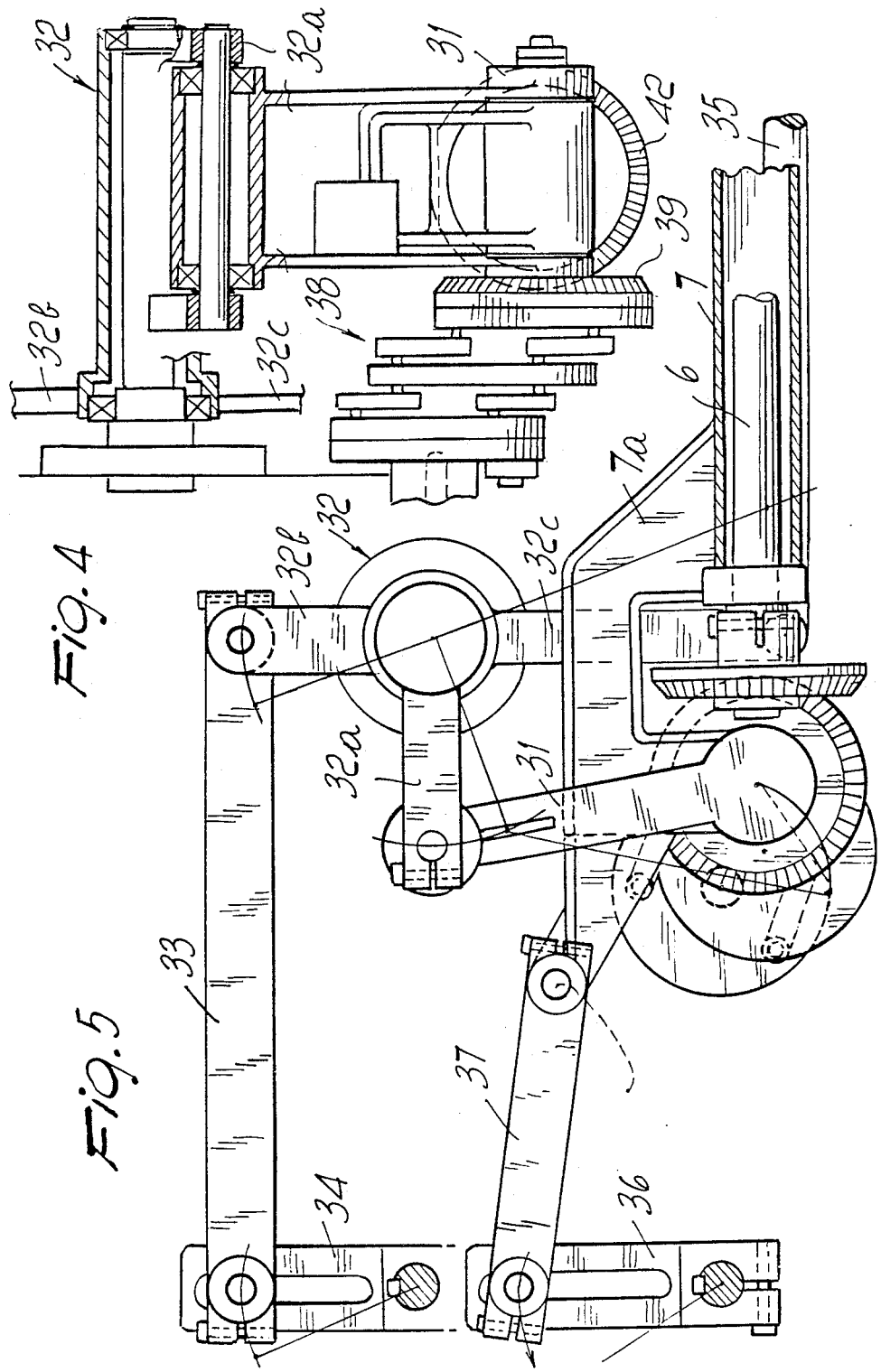

U.S. Patent  Nov. 6, 1990  Sheet 3 of 3  4,968,240
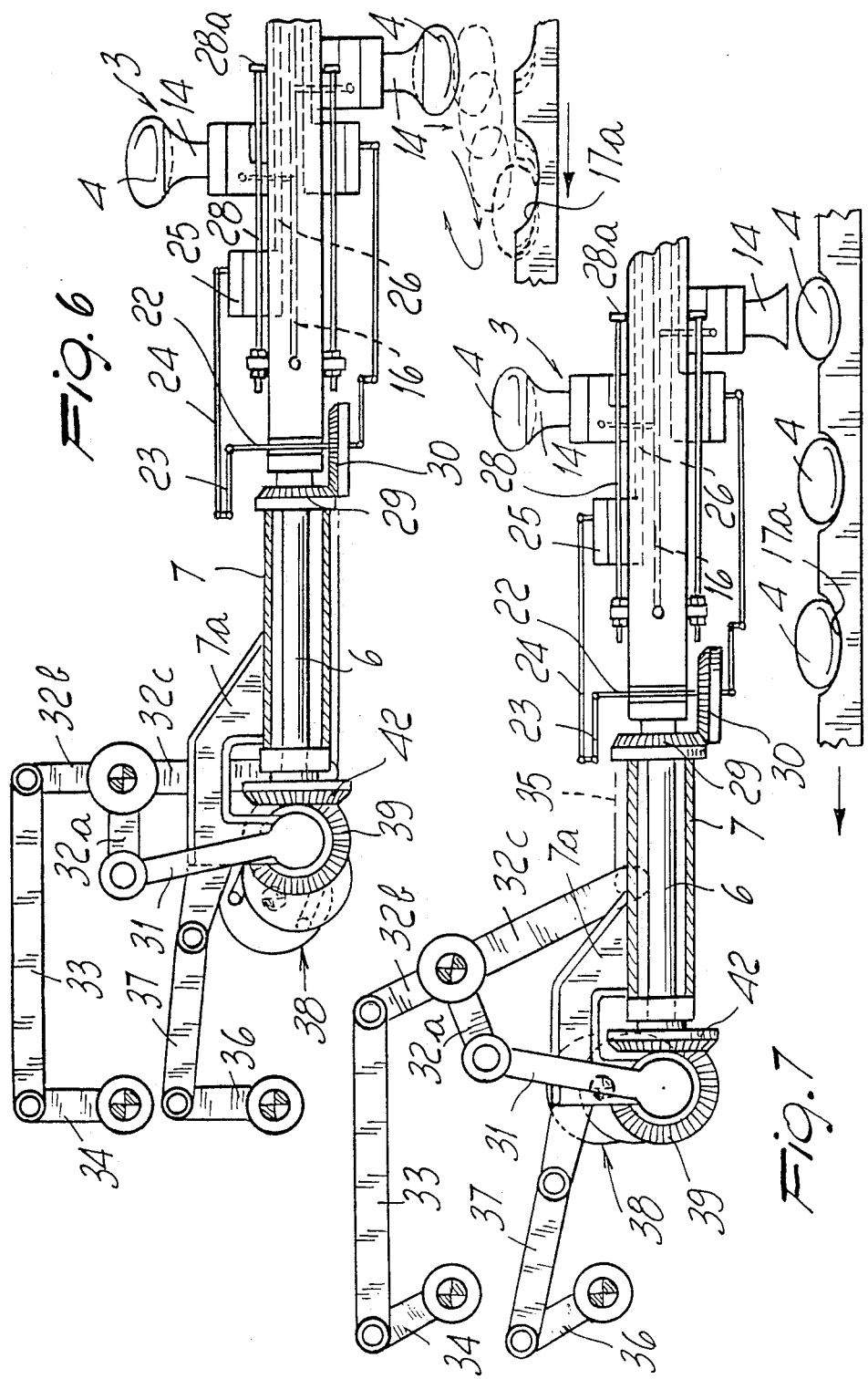

DEVICE FOR POSITIONING PRODUCTS EXTRACTED FROM A MOLD ONTO A CONVEYOR BELT, IN PARTICULAR FOR SOAP-MOLDING MACHINES OR THE LIKE

BACKGROUND OF THE INVENTION

The present invention relates to a device for positioning products extracted from a mold onto a conveyor belt, particularly for soap-molding machines or the like.

Devices are known for extracting soap-cakes molded in molding machines constituted by a rotating drum in which at least two sets of molds are defined and are arranged in mutually diametrally opposite positions; said sets, when the drum rotates about its axis, are alternately arranged facing a counter mold which molds pieces of soap and are then arranged facing the extraction device. Said extraction device generally has suckers which adhere to the soap-cakes in the mold and, after extracting them from the mold, deposit them on a conveyor belt, rotating them about an axis which is parallel to the axis of the drum of the molding machine to move the face of each soap-cake engaged with a sucker from a vertical plane in the mold to a horizontal plane on a conveyor belt.

The distance between the soap-cakes exiting from these extraction devices is substantially equal to the distance of the soap-cakes in the mold, i.e. equal to the pitch between the molding cavities on the drum. This distance is kept as small as possible so as to reduce processing waste. The soap-cakes deposited on the conveyor belt are conveyed to packaging machines which require greater distances between the soap-cakes than the abovesaid pitch in order to allow the packaging operations to be carried out correctly.

In order to adapt the distance between the soap-cakes to the requirements of the packaging machines, positioning devices are provided ahead of the packaging machines and perform the correct spacing of the soap-cakes.

Such known positioning devices have, however, some disadvantages.

More particularly, the operating speeds of said positioning devices are considerably lower than those of the molding machines and packaging machines, causing undesirable grouping of the soap-cakes at the input of the positioning device, with the possibility of collisions and damage to the soap-cakes, and do not fully exploit the productive potentiality of the packaging machines.

SUMMARY OF THE INVENTION

The aim of the present invention is to obviate the above described disadvantages by providing a device which exactly positions the soap-cakes extracted from a mold on a conveyor belt which directly feeds a packaging machine.

Within the scope of this aim, an object of the invention is to provide a device which has high productive potentiality so as to directly feed fast packaging machines.

Another object of the invention is to provide a device which is highly reliable in operation without requiring frequent interventions for maintenance.

Still another object of the invention is to provide a device which ensures the integrity of the soap-cakes during their positioning.

This aim, as well as these and other objects which will become apparent hereinafter, are achieved by a device for positioning products extracted from a mold onto a conveyor belt, in particular for soap-molding machines or the like, comprising a main body which supports grip means which are engageable with products extracted from a mold and first actuation means which act on said grip means to move them from a first product receiving position to a second position in which they are arranged facing a conveyor belt which has pockets for containing said products which are spaced with a different pitch with respect to the distance of said products in said mold, characterized in that said grip means are individually movable relatively to said main body, second actuation means being provided to act on said grip means to vary their mutual distance in relation to the distance of the products in said mold and to the pitch of said containment pockets.

BRIEF DESCRIPTION OF THE DRAWINGS

Further characteristics and advantages of the invention will become apparent from the description of a preferred but not exclusive embodiment of the device according to the invention, illustrated only by way of non-limitative example in the accompanying drawings, wherein:

FIG. 1 is a partially sectional schematic front view of the device according to the invention;

FIG. 2 is an enlarged sectional view of FIG. 1 taken along the axis II—II;

FIG. 3 is an enlarged and partially sectional plan view of part of the device according to the invention;

FIG. 4 is a lateral elevation view of the detail illustrated in FIG. 3;

FIG. 5 is a schematic front elevation view of a detail of the device according to the invention; and FIGS. 6 and 7 are partially sectional front elevation views of a detail of the device according to the invention, illustrating its operation.

DESCRIPTION OF THE PREFERRED EMBODIMENTS

With reference to the above described figures, the device according to the invention, generally indicated by the reference numeral 1, comprises a main body 2 which supports grip means 3 which are engageable with the products 4 extracted from a known mold which is not illustrated for the sake of clarity.

The products 4 can be extracted from the mold by means of a known device having a set of suckers 5, mutually spaced substantially like the products inside the mold, which are subject to negative pressure so as to engage the products 4.

The main body 2 is substantially constituted by a first horizontally arranged shaft 6 which is supported, at its longitudinal ends, by a supporting frame 7 with bearings 8 interposed so as to allow said shaft 6 to rotate about its own axis 6a. The shaft 6 has, on its lateral surface, two longitudinal guides 9 and 10 which are diametrally opposite to one another with respect to the axis 6a of the shaft 6 and accommodate the grip means 3 so that they are slideable parallel to the axis 6a. In the illustrated embodiment, the shaft 6 can be constituted, at least in the region which supports the grip means 3, by a pair of C-shaped profiled elements 11 which are arranged with their wings facing one another and which are fixed in a known manner with their central portion to a central planar profiled element 12 so as to define the longitudinal guides 9 and 10.

The grip means 3 are constituted by a plurality of supporting blocks 13 which engage, with one of their ends, in one of the longitudinal guides and have a sucker 14 at their opposite end. In this manner the blocks 13 are rigidly associated radially with respect to the shaft 6 whilst they can slide longitudinally.

The bottom of each sucker 14 is connected, through a passage 15 defined in the related block, to a duct 16 which is connected in a known manner to a vacuum generating device which is not illustrated for the sake of clarity. The duct 16 can be constituted by a tube with multiple branches which connect to the passages 15. Said tube is controllably connected to a vacuum generating device through a coupling, also of a known type and not illustrated, located on the shaft 6 so as to ensure a pneumatic connection during the rotation of the shaft 6.

In the illustrated embodiment there are four groups of blocks 13, respectively two upper groups and two lower groups, as illustrated in particular in FIG. 1. The two upper groups are connected to the same duct 16 which produces suction in the related suckers, while there is another duct 16 for the two lower groups so that the suckers of the upper group can be actuated independently from the suckers of the two lower groups. In this embodiment the positioning device can receive the products 4 from two extraction devices, each having four suckers 5, and deposit them on a conveyor belt 17, arranged below the main body 2 and having containment pockets 17a which are mutually spaced by a pitch which is suitable for feeding a packaging machine.

For greater clarity in description, reference is made hereinafter only to a single group of blocks 13.

First actuation means act on the main body 2 and rotate it about its own axis 6a so as to move the grip means 3 from a first position, whereat the suckers 14 of at least one group of small blocks 13 are arranged facing the products 4 fed by the extraction device, to a second position, whereat the suckers 14 of at least one group of blocks 13 are arranged facing the conveyor belt 17.

According to the invention there are second actuation means, generally indicated by the reference numeral 18, which act on the blocks 13 so as to vary their mutual distance in relation to the mutual distance of the products 4 when they are passed by the suckers 5 to the suckers 14; this distance is generally equal to the distance between the products during molding and is related to the pitch of the pockets 17a, which is generally different from said distance. More particularly, the suckers 14 are mutually spaced like the suckers 5 when the grip means 3 are in their first position, and like the pockets 17a when the grip means 3 are in their second position.

The second actuation means conveniently comprise: spacing means longitudinally interposed between the blocks 13 so as to cause their spacing in the first position and in the second position, and movement means which move them longitudinally to the shaft 6. More particularly, the spacer means are constituted by rods 19 which mutually connect two adjacent blocks of a same group of blocks; each rod 19 has an end rigidly associated with a block 3 and slideably traverses a seat 20 defined in the adjacent block. The free end of each rod 19 has a first stop 19a which limits the spacing distance of the two adjacent blocks. The rod 19 furthermore has, between two adjacent blocks, a second stop 19b to limit the mutual approach of the two blocks. Between the first stop 19a and the related block it is possible to interpose a spring 21 to limit the impact between the stop 19a and its related block. The rod 19 can furthermore be entirely threaded and the stops 19a and 19b can be constituted by plates having a threaded hole engaged with the rod 19 so as to allow adjustment of the approach and spacing distances among the various blocks.

The movement means comprise: a second shaft 22 which is supported by the first shaft 6 so as to be rotatable about its axis and is arranged perpendicular to the axis 6a of said shaft 6. More particularly, the shaft 22 traverses the shaft 6 proximate to one of its longitudinal ends.

A crank 23 is fixed to the shaft 22 and is connected, through a connecting rod 24, to a slider 25 which is arranged proximate to a longitudinal end of the group of blocks and is also coupled to the longitudinal guide which accommodates the block 13 of this group. The slider 23 is rigidly connected by means of a rod 26 to the block located at the opposite end of the group of blocks. The rod 26 is slideably accommodated in a longitudinal seat 27 defined in the shaft 6 or better in the blocks 13. In this manner the block directly connected to the slider 25 is moved by actuating the shaft 22 with a rotary motion, and said slider causes the translatory motion of the other blocks, varying their mutual distance, by means of the action of the rods 19. In order to prevent the block closest to the slider 25 from moving towards the block located at the other end of the group beyond a certain limit, there is a further rod 28 which is rigidly associated, at one of its ends, with the shaft 6 and slideably traverses, with its other end, said block adjacent to the slider 25; this end of the rod 28 has a stop 28a which limits the spacing of the block from the slider 25.

Advantageously the first actuation means, which rotate the shaft 6 and which will be described in greater detail hereinafter, and the second actuation means, which rotate the shaft 22, are operatively connected to one another so as to vary the mutual distance of the blocks 13 while the grip means 3 move from their first position to their second position.

The connection between the first grip means and the second grip means is provided by mounting coaxially to the shaft 6 a first conical toothed wheel 29 which is fixed to the supporting frame 7 and meshes with a second conical toothed wheel 30 keyed onto the second shaft 22. In this manner, rotation of the shaft 6 causes the rotation of the second shaft 22, as the toothed wheel 29 remains fixed. By providing this connection with a transmission ratio of 1, by turning the shaft 6 through 180° the shaft 22 is rotated through 180°, moving the crank 23 to mutually diametrally opposite positions with respect to the axis of the shaft 22.

The main body 2 is advantageously supported so as to be oscillatable in a vertical plane which is parallel to the direction of advancement of the conveyor belt 17, and third actuation means act on the main body 2 to move it towards or away from the conveyor belt 17 to facilitate the deposition of the products 4 into the containment pockets 17a.

More particularly, the supporting frame 7 has, at one of its ends, an arm 7a which is pivoted to the end of a connecting rod 31 which is pivoted, at its other end, to an arm 32a of a lever 32 having three arms, respectively 32a, 32b and 32c; said lever 32 is pivoted at an intermediate portion thereof to the supporting structure, not illustrated for the sake of clarity. The pivoting axes between the arm 7a, the connecting rod 31, the lever 32 and the supporting structure are mutually parallel and are perpendicular to the axis of the main body 2. The arm 32b is connected, through a connecting rod 33, to a first crank 34 which constitutes the third actuation means and is caused to oscillate through a preset arc so as to lower or raise the main body. The arm 32c is instead connected, by means of a rod 35, to a lever which is similar to the lever 32 and supports the other end of the supporting frame 7.

Fourth actuation means are advantageously provided and act on the main body 2 so as to move it alternately along the direction of advancement of the conveyor belt 17.

Said fourth actuation means comprise a crank 36 which is connected, by means of a connecting rod 37, to the supporting frame 7 and is controllably caused to oscillate to move the main body 2 alternately along the direction of advancement of the conveyor belt 17 so that during the deposition of the products 4 in the containment pockets 17a the main body 2 follows the conveyor belt 17 for a certain distance.

The crank 34 and the crank 36 can be actuated by means of known oscillating devices, not illustrated for the sake of clarity, which are supported by the supporting structure and are synchronized to simultaneously lower the main body and move it to follow the conveyor belt.

The first actuation means, which rotate the main body 2 about the axis 6a, comprise a known intermittence device, not illustrated, which is supported by the supporting structure and is connected, by means of an articulated joint 38 which is also of a known type, to a conical toothed wheel 39 keyed on a shaft 40 which is supported by means of bearings 4 by the supporting frame 7. The shaft 40, which also acts as pivot for the connecting rod 31, is arranged perpendicular to the axis 6a of the shaft 6. The toothed wheel 39 meshes with a toothed wheel 42 keyed to the shaft 6 so as to rotate it about the axis 6a.

In the illustrated embodiment there are two second shafts 22 proximate to each end of the first shaft 6; said second shafts have cranks 23 at their ends. Each crank 23 varies the distance between the blocks of a group of blocks substantially as described above.

For the sake of completeness in description it should be noted that a protection casing 43, associated with the main body in rigid rotatory relationship therewith, may be provided around the main body 22, with the suckers 14 protruding from said casing.

The operation of the positioning device according to the invention is as follows.

The suckers 5 arrange products 4 facing the suckers 14 of the grip means 3 in their first position. The products 4 are retained by negative pressure by the suckers 14 while the shaft 6 rotates through 180° about its axis 6a to move the suckers 14 to face the conveyor belt 17. As an effect of this rotation, as described above, the second shafts 22 also rotate through 180° about their axis, varying the mutual distance between the blocks 13 and making it equal to the pitch of the containment pockets 17a of the conveyor belt. During the rotation of the shaft 6, or immediately thereafter, the cranks 34 and 36 are caused to oscillate and, as illustrated in particular in FIGS. 6 and 7, correctly position the products 4 in the containment pockets 17a of the conveyor belt 17 by lowering the main body 2 and by making the main body 2 partially follow the conveyor belt 17 which continues to advance. Once the positioning has been performed, the negative pressure in the suckers 14 is eliminated and the products 4 are released by the grip means 3.

At this point the main body 2 is again rotated through 180° and, by virtue of the action of the cranks 23, the distance between the blocks 13 is again varied and returns to be equal to the distance between the suckers 5, i.e. equal to the mutual distance of the products 4 in the mold, and the suckers 14 are again arranged facing said suckers 5 to receive further products.

Other groups of blocks 13 are meanwhile arranged facing the conveyor belt 17 and continue the cycle.

In practice it has been observed that the device according to the invention fully achieves the intended aim and objects since, by virtue of the precision and speed in positioning the products in the containment pockets of the conveyor belt, it allows to directly and adequately feed a packaging machine.

The invention thus conceived is susceptible to numerous modifications and variations, all of which are within the scope of the inventive concept; furthermore all the details may be replaced with other technically equivalent elements.

In practice, any materials and dimensions may be employed according to requirements and the state of the art.

What is claimed is:

1. Device for positioning products extracted from a mold onto a conveyor belt, comprising;
   a supporting frame,
   at least one main body rotatably supported by said supporting frame,
   a main body axis defined by said main body,
   linear guide means defined on said main body,
   a plurality of grip members movably connected to said guide means and being spaced apart by a mutual distance,
   first actuation means positioned for rotating said main body and said plurality of grip members from a first radial position to a second radial position, and
   second actuating means positioned for varying said mutual distance by moving said plurality of grip members with respect to said main body along said linear guide means, wherein said second actuating means vary said mutual distance through linear movement of said grip members along said linear guide means during rotation of said main body and said plurality of grip means between said first radial position and said second radial position, wherein said second actuating means comprise;
   means for generating rotary motion, and
   rigid transmission elements interconnecting said means for generating rotary motion and said grip members, thereby causing linear movement of said grip members with respect to said main body and said guide means during rotation of said main body between said first position and said second position.

2. Device according to claim 1, wherein said second actuating means comprise;
   means for generating motion, and
   rigid transmission elements interconnecting said means for generating motion and said grip members, thereby causing linear movement of said grip members with respect to said main body and said guide means during rotation of said main body between said first position and said second position, wherein said means for generating motion comprise;

first conical toothed wheel fixed to said supporting frame coaxially to said main body, a second conical toothed wheel meshing with said first conical toothed wheel and being rotatably mounted on said main body for rotation about a second toothed wheel axis, said second toothed wheel axis being perpendicular to said main body axis.

3. Device according to claim 1, wherein said second actuating means comprise;

means for generating motion, and rigid transmission elements interconnecting said means for generating motion and said grip members, thereby causing linear movement of said grip members with respect to said main body and said guide means during rotation of said main body between said first position and said second position, wherein said means for generating motion comprise;

a first conical toothed wheel fixed to said supporting frame coaxially to said main body, a second conical toothed wheel meshing with said first conical toothed wheel and being rotatably mounted on said main body for rotation about a second toothed wheel axis, said second toothed wheel axis being perpendicular to said main body axis, and wherein said rigid transmission elements comprise;

crank means connected to said second conical toothed wheel, connecting rod means journalled to said crank means and being slidably connected to said grip members thereby permitting reciprocal sliding movement between said connecting rod means and said grip members, and rigid end stop means delimiting said reciprocal sliding movement between said connecting rod means and said grip members.

4. Device according to claim 3, wherein said crank means comprise at least two crank rods, said crank rods being journalled to said second conical toothed wheel at diametrically opposite locations thereon.

5. Device according to claim 3, wherein said crank means comprise at least two crank rods, said crank rods being journalled to said second conical toothed wheel at diametrically opposite locations thereon, and wherein said grip members comprise a first plurality of grip members and a second plurality of grip members, said connecting rod means connecting said first plurality of grip members to one of said two crank rods and said second plurality of grip members to another of said two crank rods, whereby said first plurality of grip members is located in said first position when said second plurality of grip members is located in said second position and vice versa.

6. Device according to claim 1, further comprising;

a supporting structure, at least one substantially vertical plane passing through said main body, lever means pivotally connected to said supporting structure, an arm-like member rigidly connected to said supporting frame, at least one connecting rod member pivotally connected to said lever means and said arm-like member, third actuation means, at least one arm connection rod pivotally connected to said arm-like member and to said third actuation means, and means for oscillating said third actuation means, thereby causing raising and lowering of said main body in said substantially vertical plane.

7. Device according to claim 6, wherein said third actuation means comprise crank means, and wherein a plurality of mutually parallel rotation axes are defined between said arm-like member and said connecting rod, between said connecting rod and said lever means, and between said lever means and said supporting structure.

8. Device according to claim 6, further comprising;

at least one fourth actuation means, a direction of advancement defined by said fourth actuation means, at least one crank connecting rod interconnecting said fourth actuation means and said supporting frame, and means for oscillating said fourth actuation means, thereby causing alternate advancement oscillations of said main body in said direction of advancement.

9. Device for positioning products extracted from a mold onto a conveyor belt comprising;

at least one supporting frame, at least one elongate main body rotatably connected to said supporting frame, linear guide means extending longitudinally on said main body, a plurality of grip members movably connected to said guide means and being spaced apart by a mutual linear distance, first actuation means positioned for rotating said main body and said plurality of grip members from at least one first radial position to at least one second radial position, and second actuating means positioned for moving said plurality of grip members with respect to said main body and said guide means, wherein said second actuating means comprise;

means for varying said mutual linear distance by moving said grip members along said linear guide means during rotation of said main body and said plurality of grip means between said first radial position and said second radial position, and a plurality of pivotally interconnected rigid connection members interconnecting said means for varying said mutual linear distance and said plurality of grip members, wherein said means for varying said mutual linear distance comprise;

means for generating rotary motion during rotation of said main body and said plurality of grip means between said first radial position and said second radial position, and means for simultaneously converting said rotary motion into linear motion of said plurality of grip members thereby varying said mutual linear distance during rotation of said main body and said plurality of grip means between said first radial position and said second radial position.

10. Device according to claim 9, wherein said second actuating means comprise;

means for generating rotary motion, and rigid transmission elements interconnecting said means for generating rotary motion and said grip members, thereby causing linear sliding movement of said grip members with respect to said main body and said guide means during rotation of said main body between said first position and said second position, wherein said means for generating rotary motion comprise;
a first conical toothed wheel fixed to said supporting frame coaxially to said main body,
a second conical toothed wheel meshing with said first conical toothed wheel and being rotatably mounted on said main body for rotation about a second toothed wheel axis, said second toothed wheel axis being perpendicular to said main body axis.

11. Device according to claim 9, wherein said second actuating means comprise;
means for generating rotary motion, and
rigid transmission elements interconnecting said means for generating rotary motion and said grip members, thereby causing linear sliding movement of said grip members with respect to said main body and said guide means during rotation of said main body between said first position and said second position, wherein said means for generating rotary motion comprise;
a first conical toothed wheel fixed to said supporting frame coaxially to said main body;
a second conical toothed wheel meshing with said first conical toothed wheel and being rotatably mounted on said main body for rotation about a second toothed wheel axis, said second toothed wheel axis being perpendicular to said main body axis, and wherein said rigid transmission elements comprise;
crank means connected to said second conical toothed wheel,
connecting rod means journalled to said crank means and being slidably connected to said grip members thereby permitting reciprocal sliding movement between said connecting rod means and said grip members, and
rigid end stop means delimiting said reciprocal sliding movement between said connecting rod means and said grip members.

12. Device according to claim 11, wherein said crank means comprise at least two crank rods, said crank rods being journalled to said second conical toothed wheel at diametrically opposite locations thereon.

13. Device according to claim 11, wherein said crank means comprise at least two crank rods, said crank rods being journalled to said second conical toothed wheel at diametrically opposite locations thereon, and wherein said grip members comprise a first plurality of grip members and a second plurality of grip members, said connecting rod means connecting said first plurality of grip members to one of said two crank rods and said second plurality of grip members to another of said two crank rods, whereby said first plurality of grip members is located in said first position when said second plurality of grip members is located in said second position and vice versa.

14. Device according to claim 9, further comprising;
a supporting structure,
at least one substantially vertical plane passing through said main body,
lever means pivotally connected to said supporting structure,
an arm-like member rigidly connected to said supporting frame,
at least one connecting rod member pivotally connected to said lever means and said arm-like member,
third actuation means,
at least one arm connection rod pivotally connected to said arm-like member and to said third actuation means, and
means for oscillating said third actuation means, thereby causing raising and lowering of said main body in said substantially vertical plane.

15. Device according to claim 14, wherein said third actuation means comprise crank means, and wherein a plurality of mutually parallel rotation axes are defined between said arm-like member and said connecting rod, between said connecting rod and said lever means, and between said lever means and said supporting structure.

16. Device according to claim 14, further comprising;
at least one fourth actuation means,
a direction of advancement defined by said fourth actuation means,
at least one crank connecting rod interconnecting said fourth actuation means and said supporting frame, and
means for oscillating said fourth actuation means, thereby causing alternate advancement oscillations of said main body in said direction of advancement.

17. Device for positioning products extracted from a mold onto a conveyor belt comprising:
at least one supporting frame,
at least one elongate main body rotatably connected to said supporting frame,
linear guide means extending longitudinally on said main body,
a plurality of grip members movably connected to said guide means and being spaced apart by a mutual linear distance,
first actuation means positioned for rotating said main body and said plurality of grip members from at least one first radial position to at least one second radial position, and
second actuating means positioned for moving said plurality of grip members with respect to said main body and said guide means, wherein said second actuating means comprise;
means for varying said mutual linear distance by moving said grip members along said linear guide means during rotation of said main body and said plurality of grip means between said first radial position and said second radial position, and
a plurality of pivotally interconnected rigid connection members interconnecting said means for varying said mutual linear distance and said plurality of grip members, and wherein said means for varying said mutual linear distance comprise;
means for generating rotary motion during rotation of said main body and said plurality of grip means between said first radial position and said second radial position, and
means for simultaneously converting said rotary motion into linear motion of said plurality of grip members thereby varying said mutual linear distance during rotation of said main body and said plurality of grip means between said first radial position and said second radial position.

18. Device according to claim 17, wherein said second actuating means comprise;
means for generating motion, and rigid transmission elements interconnecting said means for generating motion and said grip members, thereby causing linear movement of said grip members with respect to said main body and said guide means during rotation of said main body, between said first position and said second position.

19. Device according to claim 17, wherein said second actuating means comprise;
means for generating rotary motion, and
rigid transmission elements interconnecting said means for generating rotary motion and said grip members, thereby causing linear sliding movement of said grip members with respect to said main body and aid guide means during rotation of said main body between said first position and said second position, wherein said means for generating rotary motion comprise;
a first conical toothed wheel fixed to said supporting frame coaxially to said main body,
a second conical toothed wheel meshing with said first conical toothed wheel and being rotatably mounted on said main body for rotation about a second toothed wheel axis, said second toothed wheel axis being perpendicular to said main body axis.

20. Device according to claim 17, wherein said second actuating means comprise;
means for generating rotary motion, and
rigid transmission elements interconnecting said means for generating rotary motion and said grip members, thereby causing linear sliding movement of said grip members with respect to said main body and said guide means during rotation of said main body between said first position and said second position, wherein said means for generating rotary motion comprise;
a first conical toothed wheel fixed to said supporting frame coaxially to said main body,
a second conical toothed wheel meshing with said first conical toothed wheel and being rotatably mounted on said main body for rotation about a second toothed wheel axis, said second toothed wheel axis being perpendicular to said main body axis, and wherein said rigid transmission elements comprise;
crank means connected to said second conical toothed wheel,
connecting rod means journalled to said crank means and being slidably connected to said grip members thereby permitting reciprocal sliding movement between said connecting rod means and said grip members, and
rigid end stop means delimiting said reciprocal sliding movement between said connecting rod means and said grip members.

21. Device according to claim 20, wherein said crank means comprise at least two crank rods, said crank rods being journalled to said second conical toothed wheel at diametrically opposite locations thereon.

22. Device according to claim 20, wherein said crank means comprise at least two crank rods, said crank rods being journalled to said second conical toothed wheel at diametrically opposite locations thereon, and wherein said grip members comprise a first plurality of grip members and a second plurality of grip members, said connecting rod means connecting said first plurality of grip members to one of said two crank rods and said second plurality of grip members to another of said two crank rods, whereby said first plurality of grip members is located in said first position when said second plurality of grip members is located in said second position and vice versa.

23. Device according to claim 17, wherein said main body comprises at least one shaft, said shaft comprising at least two profiled elements, said profiled elements being located adjacent each other and defining therebetween at least two longitudinal guides, said grip members being slideably connected to said longitudinal guides.

24. In combination, a mold, a conveyor belt, and a device for positioning products extracted from said mold onto said conveyor belt, said device comprising;
a main body,
grip means supported by said main body and defining a mutual spacing, said grip means being engageable with products extracted from said mold.
first actuation means acting on said grip means to move said grip means from a first position for receiving said products from said mold to a second position in which said grip means are arranged facing said conveyor belt, said conveyor belt comprising;
pockets for containing products, said pockets being spaced with a pitch which is different to a distance defined between products in said mold, said grip means being individually movable relatively to said main body, said device further comprises second actuation means, said second actuation means acting on said grip means to vary said mutual spacing in relation to said distance defined between said products in said mold and in relation to said pitch spacing said containment pockets, said main body comprising a first shaft having an axis and an outer surface, said first shaft being supported for rotation about said axis and having on said outer surface, at least one longitudinal guide, said longitudinal guide slideably accommodating said grip means, said grip means being slideable in a direction substantially parallel to said axis of said shaft, said grip means comprising a plurality of supporting blocks, said blocks being slideably connected to said longitudinal guide and each having an end directed opposite to said main body, a sucker being connected to said end and connected to a suction device, said sucker being positioned for retaining said products, said second actuation means comprising spacer means and movement means, said spacer means being interposed between said supporting blocks to define said mutual spacing therebetween, said movement means comprising a crank, a second shaft having a second shaft axis, and a connecting rod having at least one end and at least one other end, said second shaft being mounted on said first shaft so as to be rotatable substantially perpendicular to said axis of rotation of said first shaft, said crank being fixed to said second shaft, said one end of said connecting rod being pivoted to said crank, said other end of said connecting rod being pivoted to a slider, said slider being slideably coupled to said longitudinal guide and arranged at a longitudinal end of said plurality of blocks, said slider being rigidly connected to one of said blocks arranged at another longitudinal end of said plurality of blocks, thereby moving said plurality of blocks when said second shaft rotates about said second shaft axis.

25. In combination, a mold, a conveyor belt, and a device for positioning products extracted from said mold onto said conveyor belt, said device comprising;

a main body, a grip means supported by said main body and defining a mutual spacing, said grip means being engageable with products extracted from said mold, first actuation means acting on said grip means to move said grip means from a first position for receiving said products from said mold to a second position in which said grip means are arranged facing said conveyor belt, said conveyor belt comprising;

pockets for containing products, said pockets being spaced with a pitch which is different to a distance defined between products in said mold, said grip means being individually movable relative to said main body, said device further comprises second actuation means, said second actuation means acting on said grip means to vary said mutual spacing in relation to said distance defined between said products in said mold and in relation to said pitch spacing said containment pockets, said main body comprising a first shaft having an axis and an outer surface, said first shaft being supported for rotation about said axis and having on said outer surface, at least one longitudinal guide, said longitudinal guide slideably accommodating said grip means, said grip means being slideable in a direction substantially parallel to said axis of said shaft, said grip means comprising a plurality of supporting blocks, said blocks being slideably connected to said longitudinal guide and each having an end directed opposite to said main body, a sucker being connected to said end and connected to a suction device, said sucker being positioned for retaining said products, said second actuation means comprising spacer means and movement means, said spacer means being interposed between said supporting blocks to define said mutual spacing therebetween, said movement means comprising a crank, a second shaft having a second shaft axis, and a connecting rod having at least one end and at least one other end, said second shaft being mounted on said first shaft so as to be rotatable substantially perpendicular to said axis of rotation of said first shaft, said crank being fixed to said second shaft, said one end of said connecting rod being pivoted to said crank, said other end of said connecting rod being pivoted to a slider, said slider being slideably coupled to said longitudinal guide and arranged at a longitudinal end of said plurality of blocks, said slider being rigidly connected to one of said blocks arranged at another longitudinal end of said plurality of blocks, thereby moving said plurality of blocks when said second shaft rotates about said second shaft axis, wherein said first shaft is rotatably supported at said axis by means of a supporting frame, a first toothed wheel being fixed to said supporting frame coaxially to said first shaft and meshing with a second toothed wheel, said second toothed wheel being keyed onto said second shaft to operatively connect said first actuation means to said second actuation means.

* * * * *